(12) United States Patent
Henrot

(10) Patent No.: US 6,505,131 B1
(45) Date of Patent: Jan. 7, 2003

(54) MULTI-RATE DIGITAL SIGNAL PROCESSOR FOR SIGNALS FROM PICK-OFFS ON A VIBRATING CONDUIT

(75) Inventor: Denis Henrot, Louisville, CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 09/344,840

(22) Filed: Jun. 28, 1999

(51) Int. Cl.[7] ............................................. G01F 17/00
(52) U.S. Cl. ...................... 702/54; 702/45; 73/861.35
(58) Field of Search .............................. 702/45, 50, 66, 702/70, 71, 72; 73/861.355, 861.357, 861.05, 861.06, 861.09; 324/58.5

(56) References Cited

U.S. PATENT DOCUMENTS

| | | | |
|---|---|---|---|
| 4,066,881 A | * | 1/1978 | Houdard .................. 708/405 |
| 4,996,871 A | | 3/1991 | Romano |
| 5,321,991 A | * | 6/1994 | Kalotay .................. 73/861.35 |
| 5,361,036 A | * | 11/1994 | White .................... 329/361 |
| 5,555,190 A | * | 9/1996 | Derby et al. .............. 702/45 |
| 5,583,784 A | * | 12/1996 | Kapust et al. ............. 702/77 |
| 5,734,112 A | | 3/1998 | Bose et al. |
| 5,741,980 A | * | 4/1998 | Hill et al. .............. 73/861.04 |
| 5,926,096 A | * | 7/1999 | Matter et al. ............ 340/606 |
| 6,233,529 B1 | * | 5/2001 | Cunningham ............... 702/76 |

FOREIGN PATENT DOCUMENTS

| | | |
|---|---|---|
| EP | 0 866 319 A1 | 9/1998 |
| GB | 1 219 887 | 1/1971 |

* cited by examiner

Primary Examiner—Marc S. Hoff
Assistant Examiner—Mohamed Charioui
(74) Attorney, Agent, or Firm—Faegre & Benson LLP

(57) ABSTRACT

A digital signal processor for determining a property of a material flowing through a conduit. The digital signal processor of this invention receives signals from two pick-off sensor mounted at two different points along a flow tube at a first sample rate. The signals are converted to digital signals. The digital signals are decimated from a first sample rate to a desired sample rate. The frequency of the received signals is then determined from the digital signals at the desired sample rate.

26 Claims, 7 Drawing Sheets

MULTI-RATE DIGITAL SIGNAL PROCESSOR FOR SIGNALS FROM PICK-OFFS ON A VIBRATING CONDUIT

FIELD OF THE INVENTION

This invention relates to a signal processor for an apparatus that measures properties of a material flowing through at least one vibrating conduit in the apparatus. More particularly, this invention relates to a digital signal processor for performing calculations to determine the frequencies of signals receive from pick-off sensors measuring the frequency of vibrations of the conduit.

Problem

It is known to use Coriolis effect mass flowmeters to measure mass flow and other information for materials flowing through a conduit in the flowmeter. Exemplary Coriolis flowmeters are disclosed in U.S. Pat. Nos. 4,109,524 of Aug. 29, 1978, U.S. Pat. No. 4,491,025 of Jan. 1, 1985, and U.S. Pat. No. Re. 31,450 of Feb. 11, 1982, all to J. E. Smith et al. These flowmeters have one or more conduits of a straight or a curved configuration. Each conduit configuration in a Coriolis mass flowmeter has a set of natural vibration modes, which may be of a simple bending, torsional or coupled type. Each conduit is driven to oscillate at resonance in one of these natural modes. Material flows into the flowmeter from a connected pipeline on the inlet side of the flowmeter, is directed through the conduit or conduits, and exits the flowmeter through the outlet side of the flowmeter. The natural vibration modes of the vibrating, material filled system are defined in part by the combined mass of the conduits and the material flowing within the conduits.

When there is no flow through the flowmeter, all points along the conduit oscillate due to an applied driver force with identical phase or small initial fixed phase offset which can be corrected. As material begins to flow, Coriolis forces cause each point along the conduit to have a different phase. The phase on the inlet side of the conduit lags the driver, while the phase on the outlet side of the conduit leads the driver. Pick-off sensors are placed on the conduit(s) to produce sinusoidal signals representative of the motion of the conduit(s). Signals outputted from the pick-off sensors are processed to determine the phase difference between the pick-off sensors. The phase difference between two pick-off sensor signals is proportional to the mass flow rate of material through the conduit(s).

A Coriolis flowmeter has a transmitter which generates a drive signal to operate the driver and determines a mass flow rate and other properties of a material from signals received from the pick-off sensors. A conventional transmitter is made of analog circuitry which is designed to generate the drive signal and detect the signals from the pick-off sensors. Analog transmitters have been optimized over the years and have become relatively cheap to manufacture. It is therefore desirable to design Coriolis flowmeters that can use conventional transmitters.

It is a problem that conventional transmitters must work with signals in a narrow range of operating frequencies. This range of operating frequencies is typically between 20 Hz and 200 Hz. This limits the designers to this narrow range of operating frequencies. Furthermore, the narrow range of operating frequencies makes it impossible to use a conventional transmitter with some flowmeters, such as straight tube flowmeters, which operate in a higher frequency range of 300–800 Hz. Straight tube flowmeters operating at 300–800 Hz tend to exhibit smaller sensitivity to Coriolis effects used to measure mass flow rate. Therefore, a finer measurement of the phase difference between sensors is-needed to calculate mass flow rate.

In order to use one type of transmitter on several different designs of Coriolis flowmeters operating at several different frequencies, manufacturers of Coriolis flowmeter have found that it is desirable to use a digital signal processor to generate the drive signals and process the signals received from the pick-off sensors. A digital signal processor is desirable because the higher demand in measurement resolution and accuracy put on analog electronic components by flowmeters operating at higher frequencies, such as straight tube designs, are avoided by the digitalization of signals from the pick-offs as the signals are received by the transmitter. Furthermore, the instructions for signaling processes used a digital processor may be modified to operate on several different frequencies.

However, digital signal processors have several disadvantages as compared to conventional analog circuit transmitters. A first problem with a digital signal processor is that digital processors are more expensive to produce because the circuitry is more complex. Secondly, digital signal processors require a circuit board having a greater surface area which can cause problems when space is at a premium in a flowmeter design. Thirdly, digital signal processors require more power to operate than analog circuits. Power consumption is especially a problem when a processor must operate at a maximum clock rate in order to provide all the computations needed to process the signals and generate a material property measurement, such as mass flow. For all of these reasons, there is a need in the art for a digital signal processor that is adaptable across several flowmeter designs, that is inexpensive to produce and reduces the amount of power needed to perform the needed computations.

Solution

The above and other problems are solved and an advance in the art is made by the provision of a multi-rate digital signal processor of the present invention. The present invention is comprised of processes that are stored in a memory and executed by the processor in order to process the signals received from pick-offs on a vibrating conduit. The processes of this invention offer many advantages that make it viable to use a single type of digital signal processor in many types of Coriolis flowmeters.

A first advantage of the processes of the present invention is that the processes do not lose accuracy in spite of using finite arithmetic in lieu of floating point arithmetic. A second advantage of the processes of the present invention is that the processes can be implemented on any number of low cost, low power digital signal processors such the Texas Instruments TM3205xx, Analog Devices ADSP21xx, or Motorola 5306x. The instructions for the processes of the present invention are small enough to reside in the internal memory of a digital signal processor which eliminates the need for fast access external memory which increases the cost, power consumption and board space for the transmitter. The processes have a small number of computational constructs which improves the portability of the processes between low cost processors.

A third advantage is that the computational requirement of the processes is minimized. This reduction in the computational requirement allows the digital signal processor to run at a clock rate lower than the maximum clock rate of the processor which reduces the power consumption of the processor.

A transmitter that performs the processes of the present invention has the following electronic components. Analog signals from the pick-offs attached to the sensors are received by an Analog to Digital ("A/D") converter. The converted digital signals are applied to a standard digital processor. The digital processor is a processing unit that executes machine readable instructions that are stored in a memory connected to the processor via a bus. A typical digital processor has a Read Only Memory (ROM) which stores the instructions for performing desired processes such as the processes of the present invention. The processor is also connected to a Random Access Memory which stores the instructions for a process that is currently being executed and the data needed to perform the process. The processor may also generate drive signals for the Coriolis flowmeter. In order to apply the drive signal to a drive system, a digital processor may be connected to a Digital to Analog (D/A) convertor which receives digital signals from the processor and applies analog signals to the drive system.

The processes of the present invention perform the following functions to determine the frequencies of the signals received from the pick-off sensors as well as the phase difference between the signals. First, the signals are received from the pick off sensor at a first sample rate. A sample rate is the amount of inputs received from the pick-offs that are used to characterize the signals from the pick-offs. The signals are then decimated from a first sample rate to a desired sample rate. Decimation is simply converting from a first number of samples to a lesser number of samples. Decimation is performed to increase the resolution of the signals sampled to provide a more precise calculation of signal frequency for each signal. The frequency of each signal is then determined.

In order to use the same processes with different flowmeters having different frequencies, the following steps may also be performed. An estimate of the oscillation frequency of the flowmeter is calculated. The estimated frequency is then used to demodulate the signals from each pick-off into an I component and a Q component. The I component and the Q component are then used to translate the signals to a center frequency if the operating frequency of the signals is greater than a transition frequency. After demodulation, the signals may be decimated a second time to improve the resolution of the signals a second time.

The dominant frequency of the signals is then isolated and precisely measured. The translation to a zero frequency is then calculated for both the I component and Q components of the signals. At this time, each component may decimated again to improve the accuracy of measurement. The frequency band of each signal can be narrowed as much as desired by appropriate low pass filtering at this time. A complex correlation is then performed which determines the phase difference between the signals.

The above process allows a low power, low cost, digital processor to be used in a different types of Coriolis flowmeter which operate over a wide range of operating frequencies.

DESCRIPTION OF THE DRAWINGS

The present invention can be understood from the following detailed description and the following drawings.

DETAILED DESCRIPTION

Figure 1:
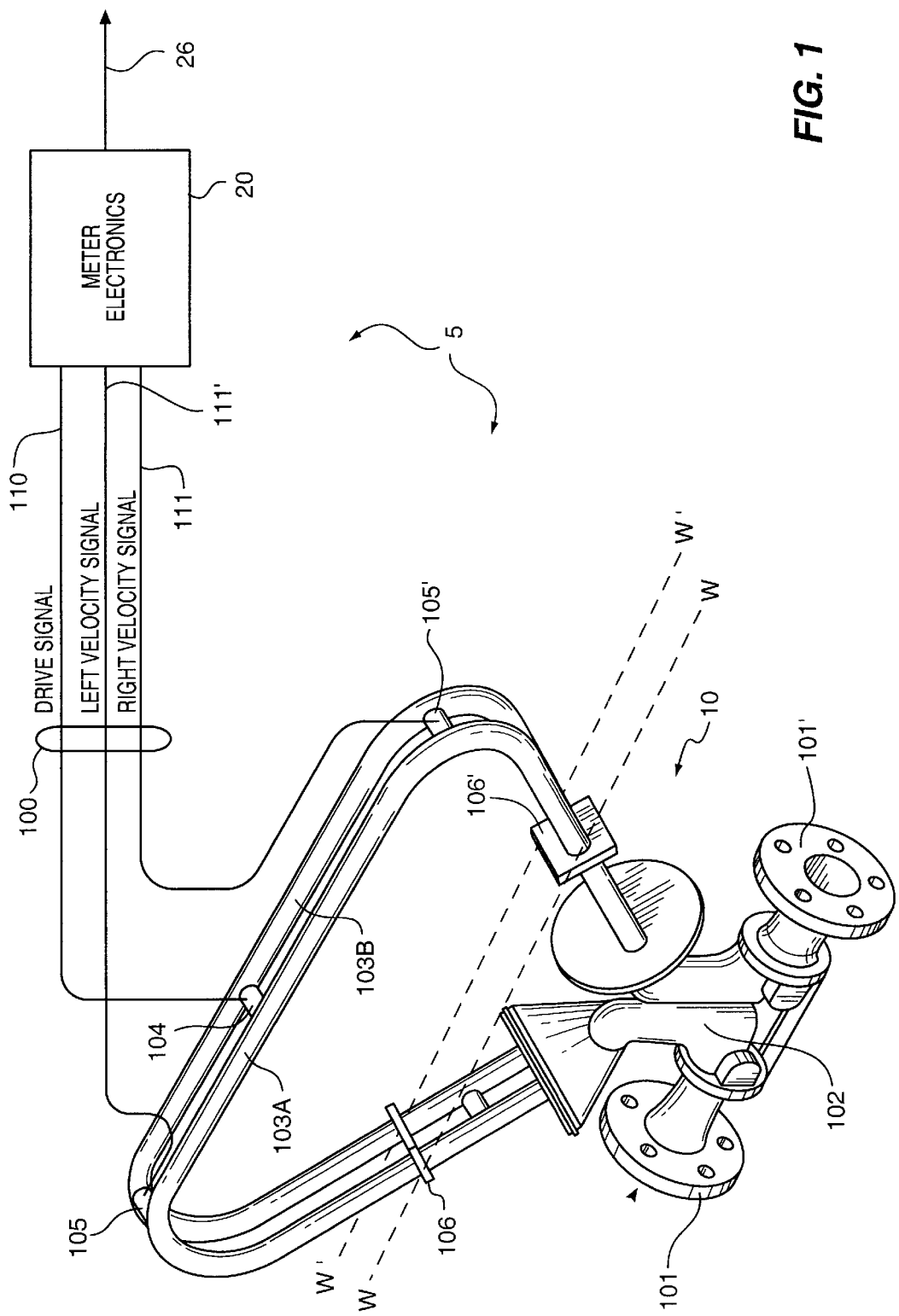
FIG. 1 illustrating a Coriolis Flowmeter having a digital transmitter that performs multi-rate pick-off signal processes of this invention.

Coriolis Flowmeter in General—FIG. 1

FIG. 1 shows a Coriolis flowmeter 5 comprising a Coriolis meter assembly 10 and transmitter 20. Transmitter 20 is connected to meter assembly 10 via leads 100 to provide density, mass flow rate, volume flow rate, temperature, totalized mass flow, and enhanced density over path 26. A Coriolis flowmeter structure is described although it should be apparent to those skilled in the art that the present invention could be practiced in conjunction with any apparatus having a vibrating conduit to measure properties of material. A second example of such an apparatus is a vibrating tube densitometer which does not have the additional measurement capability provided by a Coriolis mass flowmeter.

Meter assembly 10 includes a pair of flanges 101 and 101', manifold 102 and conduits 103A and 103B. Driver 104 and pick-off sensors 105 and 105' are connected to conduits 103A–B. Brace bars 106 and 106' serve to define the axis W and W' about which each conduit oscillates.

When flowmeter 10 is inserted into a pipeline system (not shown) which carries the process material that is being measured, material enters meter assembly 10 through flange 101, passes through manifold 102 where the material is directed to enter conduits 103A and 103B, flows through conduits 103A and 103B and back into manifold 102 from where it exits meter assembly 10 through flange 101'.

Conduits 103A and 103B are selected and appropriately mounted to the manifold 102 so as to have substantially the same mass distribution, moments of inertia and elastic modules about bending axes W—W and W'—W', respectively. The conduits extend outwardly from the manifold in an essentially parallel fashion.

Conduits 103A–103B are driven by driver 104 in opposite directions about their respective bending axes W and W' and at what is termed the first out of phase bending mode of the flowmeter. Driver 104 may comprise any one of many well known arrangements, such as a magnet mounted to conduit 103A and an opposing coil mounted to conduit 103B and through which an alternating current is passed for vibrating both conduits. A suitable drive signal is applied by meter electronics 20, via lead 110, to driver 104.

Transmitter 20 receives the left and right velocity signals appearing on leads 111 and 111', respectively. Transmitter 20 produces the drive signal appearing on lead 110 and causing driver 104 to vibrate tubes 103A and 103B. Transmitter 20 processes the left and right velocity signals to compute the mass flow rate and the density of the material passing through meter assembly 10. This information is applied to path 26.

It is known to those skilled in the art that Coriolis flowmeter 5 is quite similar in structure to a vibrating tube densitometer. Vibrating tube densitometers also utilize a vibrating tube through which fluid flows or, in the case of a sample-type densitometer, within which fluid is held. Vibrating tube densitometers also employ a drive system for exciting the conduit to vibrate. Vibrating tube densitometers typically utilize only single feedback signal since a density measurement requires only the measurement of frequency and a phase measurement is not necessary. The descriptions of the present invention herein apply equally to vibrating tube densitometers.

Figure 2:
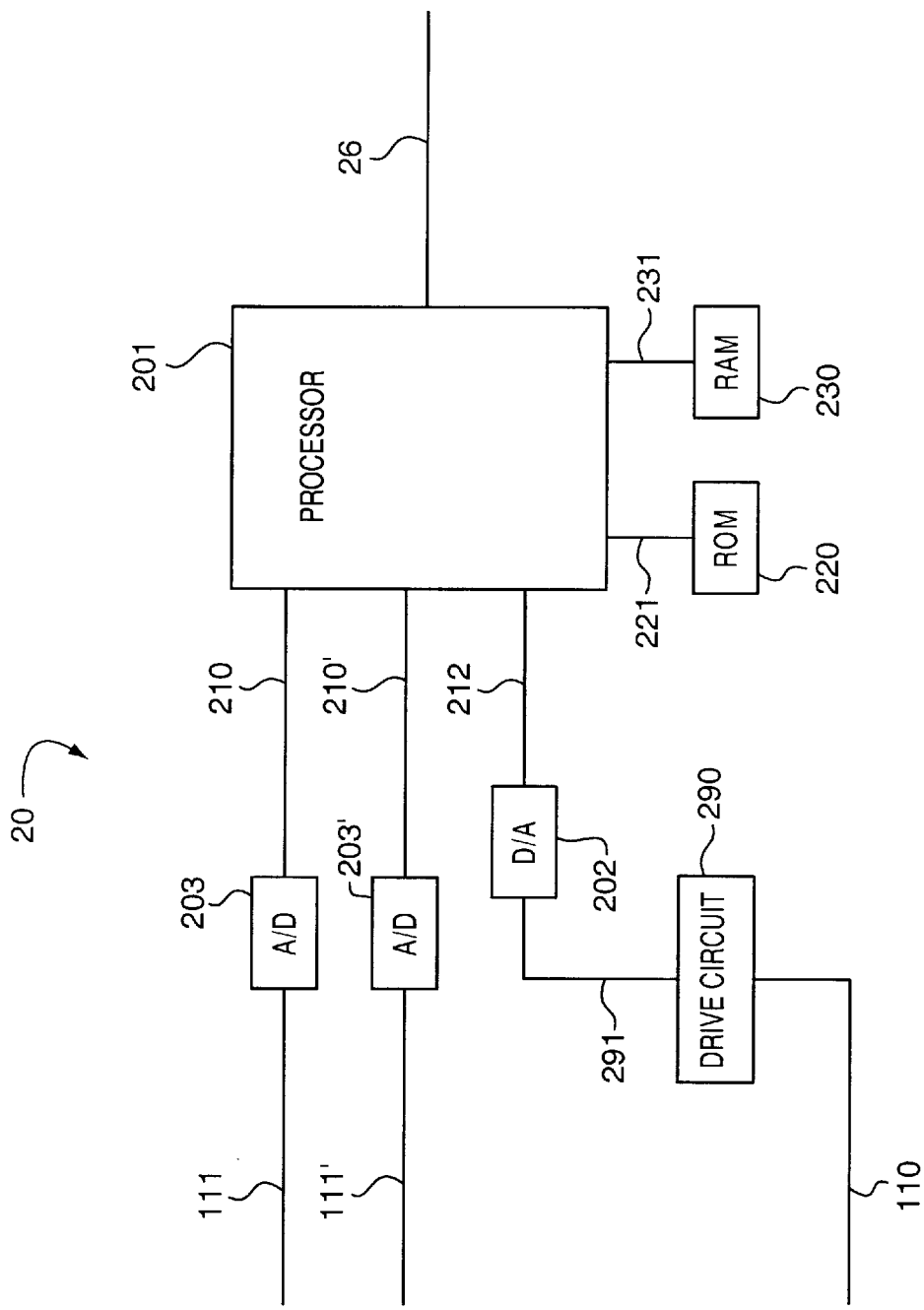
FIG. 2 illustrating a block diagram of a digital signal transmitter.

A Digital Transmitter 20—FIG. 2.

FIG. 2. illustrates of the components of a digital transmitter 20. Paths 111 and 111' transmit the left and right velocity signals from flowmeter assembly 10 to transmitter 20. The velocity signals are received by analog to digital (A/D) convertor 203 in meter electronic 20. A/D convertor 203 converts the left and right velocity signals to digital signals usable by processing unit 201 and transmits the digital signals over path 210–210'. Although shown as separate components, A/D convertor 203 may be a single convertor, such as an AK4516 16-bit codec chip, which provides 2 convertors so that signals from both pick-offs are converted simultaneously. The digital signals are carried by paths 210–210' to processor 201. One skilled in the art will recognize that any number of pick-offs and other sensors, such as an RTD sensor for determining the temperature of the flow tube, may be connected to processor 201.

Driver signals are transmitted over path 212 which applies the signals to digital to analog (D/A) convertor 202. D/A convertor 202 is a common D/A convertor and may be a separate D/A convertor or one that is integrated in a stereo CODEC chip such as a standard AKM 4516. Another common D/A convertor 202 is a AD7943 chip. The analog signals from D/A convertor 202 are transmitted to drive circuit 290 via path 291. Drive circuit 291 then applies the drive signal to driver 104 via path 110. Path 26 carries signals to input and output means (not shown) which allows transmitter 20 to receive data from and convey data to an operator.

Processing unit 201 is a micro-processor, processor, or group of processors that reads instructions from memory and executes the instructions to perform the various functions of the flowmeter. In a preferred embodiment, processor 201 is a ADSP-2185L microprocessor manufactured by Analog Devices. The functions performed include but are not limited to computing mass flow rate of a material, computing volume flow rate of a material, and computing density of a material which may be stored as instructions in a Read Only Memory (ROM) 220. The data as well as instructions for performing the various functions are stored in a Random Access Memory (RAM) 230. Processor 201 performs read and write operations in RAM memory 230 via path 231.

Figure 3:
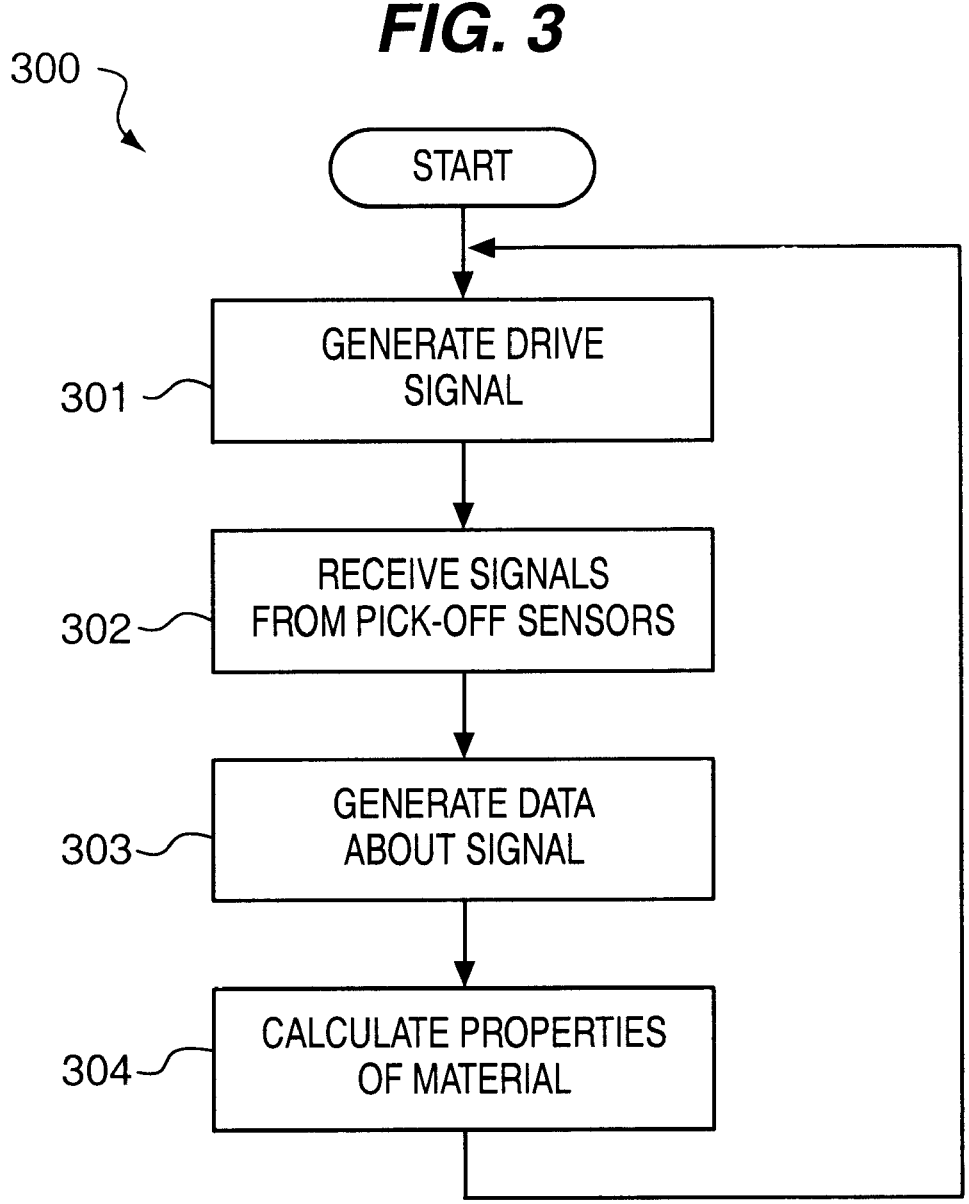
FIG. 3 illustrating a flow diagram of the operations performed by a digital transmitter.

Overview of Operation Performed by Digital Transmitter 20—FIG. 3.

FIG. 3 is an overview of the functions performed by digital transmitter 20 to operate Coriolis flowmeter 5. Process 300 begins in step 301 with transmitter 20 generating a drive signal. The drive signal is then applied to driver 104 via path 110. In step 302, digital transmitter 20 receives signals from pick-off 105 and 105' responsive to vibration of said flow tubes 103 A–B as material passes through flow tubes 103A–B. Data about the signals such as signal frequency and phase difference between signals is performed by digital transmitter 20 in step 303. Information about properties of a material flowing through flow tubes 103A and 103B, such as mass flow rate, density, and volumetric flow rate, are then calculated from the data in step 304. Process 300 is then repeated as long as Coriolis flowmeter 5 is operating within a pipeline.

Figure 4:
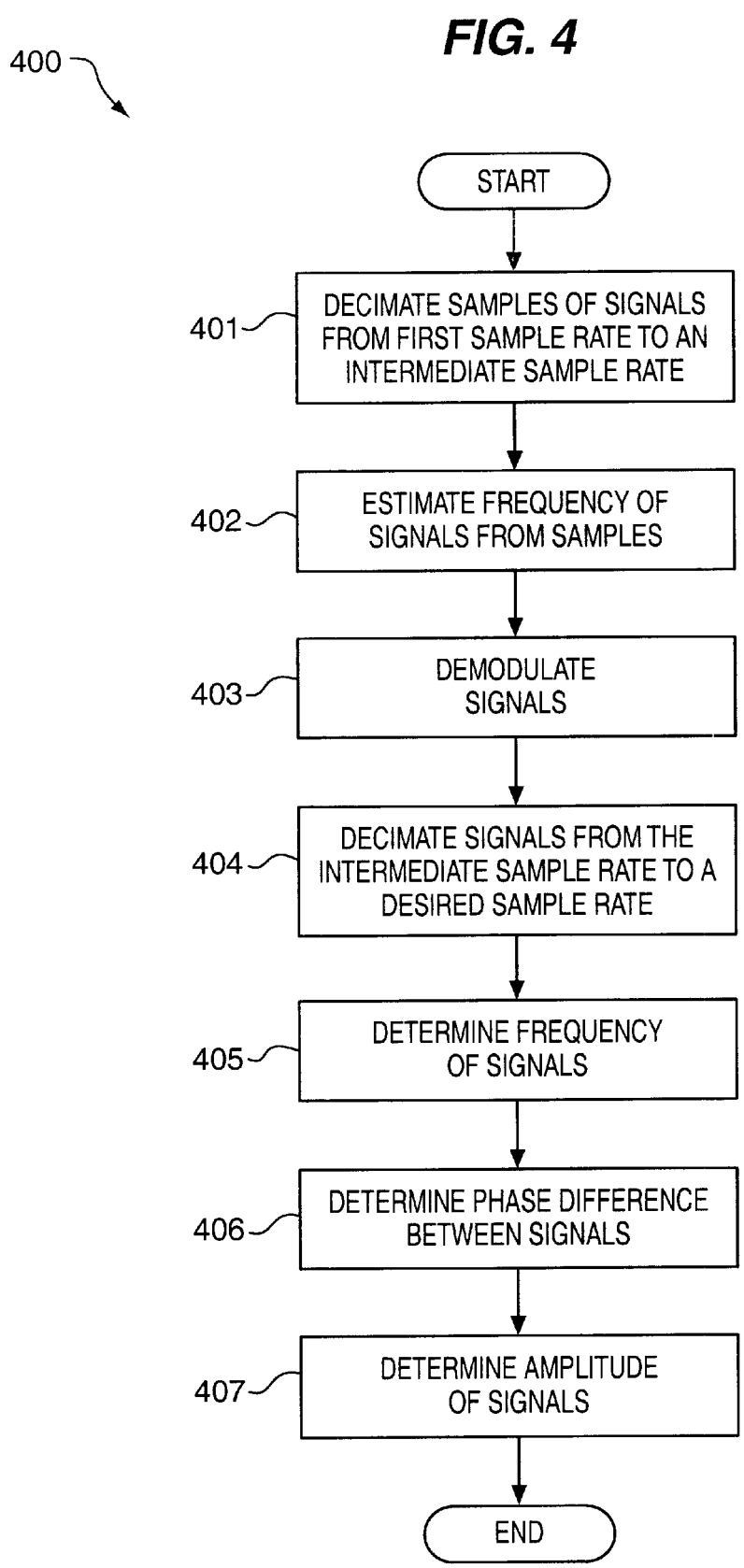
FIG. 4 illustrating a flow diagram a process for generating data from signals received from pick-off sensors.

A Process for Generating Data About the Pick-off Signals in Accordance with the Present Invention—FIG. 4.

FIG. 4 illustrates process 400 which is a process for generating data such as a signal's frequency for signals received from pick-offs 105 and 105' that measure the oscillations of flow tubes 103A–B in Coriolis flowmeter 5. Process 400 offers several advantages for use in a digital transmitter 20. A first advantage of process 400 is that there is no loss of accuracy despite the use of finite point arithmetic instead of floating point arithmetic. This allows a low cost, low power processor such the TMS3205xxx manufactured by Texas Instrument, The ADSP21xx manufactured by Analog Devices, or the 5306x manufactured by Motorola Inc. A second advantage is that the memory requirement for the instructions for process 400 is small enough to reside in the internal memory of the processor which eliminates the need for a high speed bus between the processor and an external memory. The computational requirements are reduced by process 400 which allows the processor to operate at substantially less than its maximum clock rate.

Process 400 begins in step 401 by decimating the sample rate of signals received from the pick-offs from a first sample rate to a second, lesser sample rate. In a preferred embodiment, the signals are decimated from a first sample rate of 48 kHz to a second sample rate of 4 kHz. The decimation of sample rates increases the resolution of the signals which increases the accuracy of the calculations as described below in FIG. 5. In the preferred embodiment, the reduction of the sample rate from 48 kHz to 4 kHz increases the resolution of the sample from B bits to B+1.79 bits.

In step 402, an estimate of the signal frequency is calculated from the sampled signals. A preferred process is to calculate an estimated signal frequency is provided in FIG. 6. The estimated signal frequency is then used to demodulate the received signals in step 403. A process for demodulating the digital signals is given in FIGS. 7 and 8. A second decimation of the sampled signals is performed in step 404. The second decimation reduces the signal samples from a second sample rate to a third sample rate to increase the resolution of the sampled signal. In the preferred embodiment, the reduction is from a sample rate of 4 kHz to a rate of 800 Hz which increases the resolution to B+2.95 bits. This reduction is performed in the same manner as the decimation in step 401.

After the second decimation in step 404, calculation are made based upon the received signals. This is performed as part of a process shown FIG. 9. After the noise has been removed, the frequency of the signals from each pick-off is determined in step 405. In step 406, a phase difference between the signal from a first pick-off and the signal from a second pick-off is determined. The amplitude of each signal is then determined in step 407. Process 400 is then either repeated as long as the flowmeter is in operation or process 400 ends.

Figure 5:
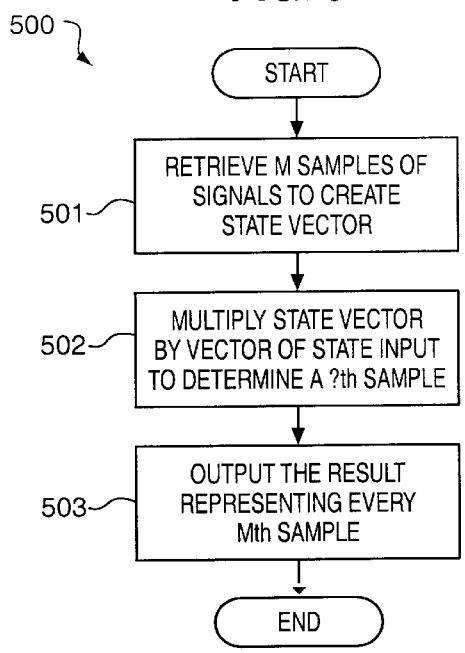
FIG. 5 illustrating a process for performing a decimation of signal samples from a pick-off.

A Process for Decimating Sample Rates of Signals from Pick-offs-FIG. 5

FIG. 5 illustrates a process for decimating the rate of samples received from pick-offs. The same process is used for the decimation performed in each of steps 401, 404, and in the process for determining frequency of the signal. In each of these steps, process 500 is performed for signals from each pick-off separately. The difference between the decimation performed in each step is the length of the input data vectors as described below.

A decimation as described in process 500 is implemented using a block processing method with the size of the input vector being equal to the decimation ratio. The decimation ratio is the amount that the sample frequency is being reduced by the decimation. Using this block processing method is an operational advantage since the process must only be repeated at an output data rate rather than at an input data rate. The principle behind recursion block filtering is that a state variable representation of the signals is:

$$x_{k+1}=A*X_k+B*u_k;$$

$$y_k=C*X_k+D*u_k;$$

Where:
- A,B,C,D=matrices representing the state of the system;
- $x_k$=an N+1 state vector at time k;
- $u_k$=an input; and
- $y_k$=an output of representing a decimated signal.

From induction, it is clear that:

$$\left(\begin{array}{c} x_{k+m} \\ \hline y_k \\ y_{k+1} \\ \vdots \\ y_{k+M-1} \end{array}\right) = \left(\begin{array}{c|cccc} A_m & A_{m-1}B & A_{m-2}B & \cdots & B \\ \hline C & D & 0 & \cdots & 0 \\ CA & CB & D & \cdots & 0 \\ \vdots & \vdots & \vdots & \ddots & \vdots \\ CA_{m-1} & CA_{m-2}B & CA_{m-3}B & \cdots & D \end{array}\right) \left(\begin{array}{c} x_k \\ u_k \\ u_{k+1} \\ \vdots \\ u_{k+M-1} \end{array}\right)$$

When decimating a signal by a factor of M, only every M-th sample is going to be kept. Therefore, all but the last output row of the above matrix can be eliminated to yield the following equation:

$$\left(\frac{x_{k+M}}{y_{k+M-1}}\right) = \left(\begin{array}{c|cccc} A_M & A_{M-1}B & A_{M-2}B & \cdots & B \\ \hline CA_{m-1} & CA_{M-2}B & CA_{m-3}B & \cdots & D \end{array}\right)$$

From the above, it is obvious that the number of accumulate/multiply operations for one recursion of the above equation is:

$$N_{MAC}=(N+1)*(N+M)$$

where:
- $N_{MAC}$=number of accumulate/multiply operations;
- N=order of the matrix A; and
- M=the block size which is equal to the decimation rate of the process.

Therefore, the computational load for performing the decimation is $$R_{svd}=F_{out}*N_{MAC}$$

where:
- $R_{svd}$=the computational load on a processor; and
- $F_{out}$=represents the filter output rate.

The memory needed to perform a decimation is as follows:
- memory to store each filter coefficient which may be read-only (ROM);
- memory to store the filter state vector $x_k$ which must be read-write (RAM); and
- an input block buffer memory (read-write).

FIG. 5 illustrates the process of decimation using the above block processing method. Process 500 begins in step 501 by receiving m samples into a buffer to create an input block. The input block is then multiplied by the state vector in step 502. The results outputting every mth sample are then outputted in step 503 for use in other calculations. Process 500 ends after step 503.

Figure 6:
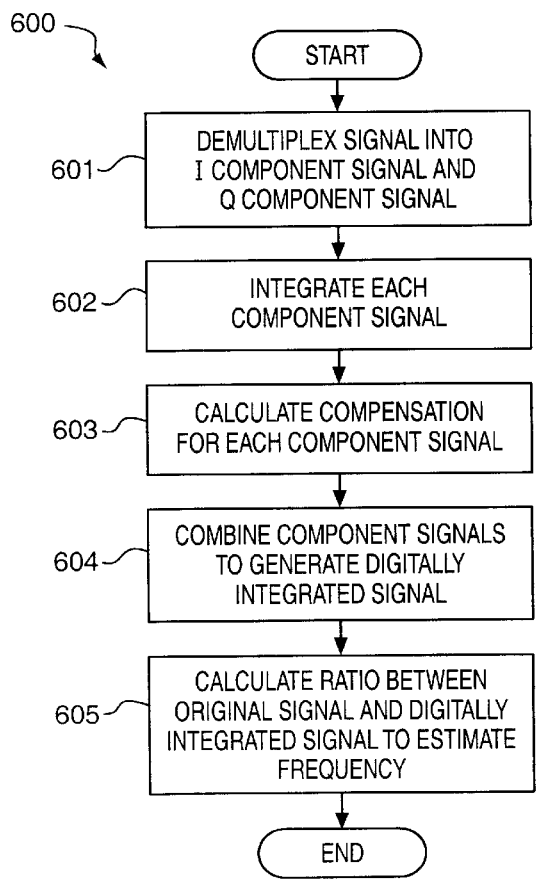
FIG. 6 illustrating a process of calculating an estimated frequency of the signals received from the pick-offs.

A Process for Estimating the Frequency of the Received Signals FIG. 6.

Process 600 is a process for estimating the frequency of the received signals in order to demodulate the signals in a subsequent process step. Process 600 must be completed in step 403 before the signals can be demodulated. The subsequent demodulation is described below and shown in FIG. 7.

The process 600 for estimating the frequency of the signals is shown in FIG. 6. This process 600 is performed on either one of the received signals. Process 600 begins in step 601 by demultiplexing the sampled digital signal into an In-phase (I) and a quadrature (Q) component. A digital integration is then performed on the I component and the Q component of the signal in step 602. In step 603, a signal compensation is calculated on the integrated signal. The signal components are then multiplexed to generate a digitally integrated signal in step 604. The ratio between the original signal and the digitally integrated signal is then calculated in step 605. The ratio provides an estimate of the signal frequency which may be used to demodulate the signals in process 700.

Process 600 uses fixed coefficient filters to estimate the frequency. Therefore no recursive algorithm is needed. Since recursion is not used, process 600 always converges. Furthermore, process 600 rapidly tracks changes in the frequency. The estimated frequency at the end of process 600 is given by the following equation:

$$F_{est}=(\omega_{est}/2\Pi)\times(F_s/12)$$

where:
- $F_{est}$=estimatedfrequency;
- $\omega_{est}$=normalizedpulsation; and
- $F_s$=frequencyofsamples.

Figure 8:
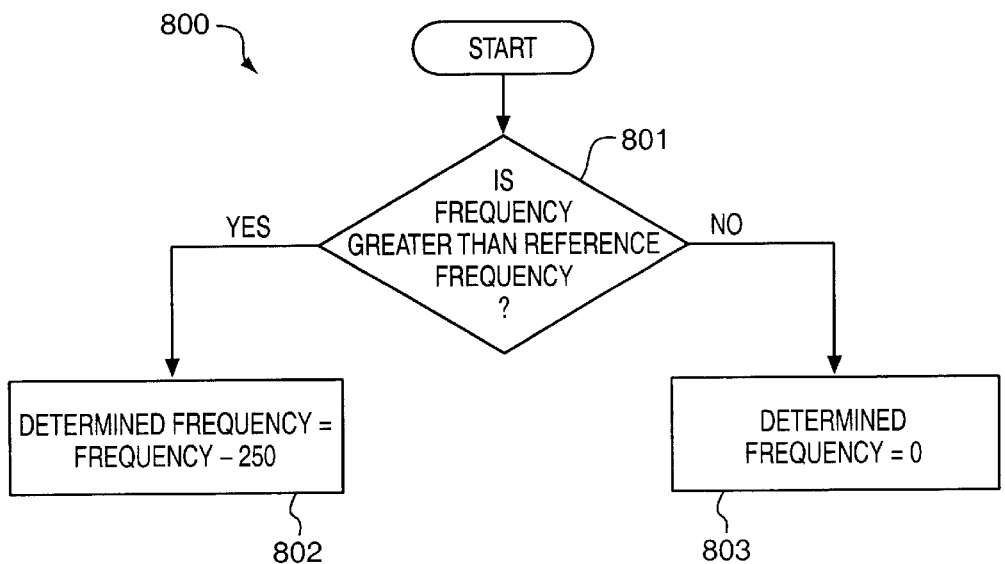
FIG. 8 illustrating a process for demodulating the received signals.

A Process for a High-Low Frequency Selector—FIG. 8

Process 800 illustrated in FIG. 8 an optional process that may be performed between the frequency estimate and demodulation of the signal. The high low frequency selector is needed to determine the frequency of interest. Process 1000 (SEE FIG. 9). which accurately measures the signal frequency, exhibits an estimate bias and slower convergence in the normalized frequency range:

$$|F_o|\leq 0.05 \cup |F_o|>0.45$$

where:
- $F_o$=normalized frequency of signal.

From this equation, it is apparent that the process for determining frequency is not accurate when the sample rate is 4 kHz and the frequency of the signal measured is as low as 20 Hz. Process 800 remedies this situation to allow process 1000 to be used over a large band of frequencies. This is done by determining whether the process will operate in a high or a low frequency mode in the following manner. Process 800 begins in step 801 by determining whether the estimated frequency is less than or equal to a reference frequency. In a preferred embodiment, the reference frequency is chosen to 250 Hz. 250 Hz is chosen as it is a frequency between the normal operating frequencies of conventional flow tubes and straight flow tubes.

If the actual estimated frequency is less than the reference frequency, an estimated frequency of zero is returned. If the actual estimated frequency is greater than the reference frequency, the estimated frequency is calculated to be the actual estimated frequency minus 120 Hz.

Figure 7:
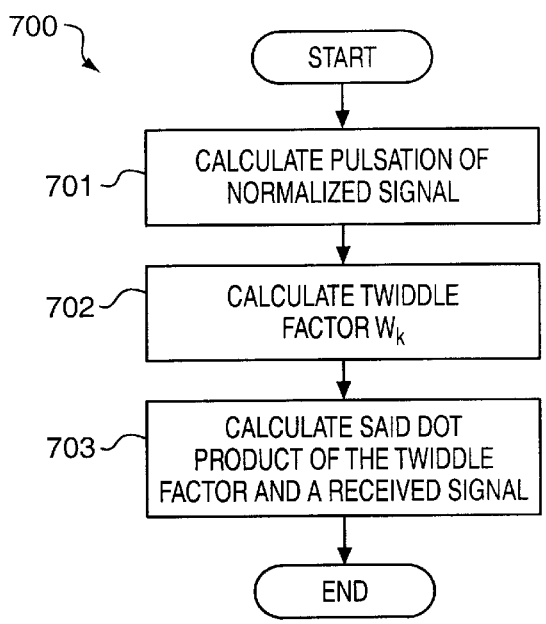
FIG. 7 illustrating a process for performing a high-low frequency selection for the received signals.

A Process for Demodulating the Received Signals—FIG. 7

FIG. 7 illustrates a process 700 for demodulating the received digital signals.

This process uses the estimated frequency that was either calculated in process 600 (FIG. 6) or in process 800 (FIG. 8). Process 700 begins in step 701 by calculating a normalized pulsation, which is expressed in the following equation:

$$\omega_d = 2\Pi(12F_d)/F_s$$

where:
- $\omega_d$ = the normalized pulsation;
- $F_d$ = the estimated frequency; and
- $F_s$ = the frequency of the samples.

The real valued 'twiddle' factor is calculated in step 701 according to the following equation:

$$W_k = \cos((\omega_{dk}))$$

with $$x\beta = A\beta\cos(\omega_o k + \phi_\beta)$$

where
- β = received signal from either
- one of the pick—off sensors.

The dot product of the 'twiddle factor' and the actual received signal is calculated in step 702 by the following equation:

$$y_\beta = W_k X_\beta(k) = (A_b/2)\{\cos((\omega+\omega_d)k+\phi) + \cos((\omega-\omega_d)k+\phi)\}$$

It should be noted that if process 800 yields to the low frequency mode low mode where the estimated frequency is equal to zero, $y_\beta(k) = x_\beta(k)$. Otherwise the modulated output signal has two components as shown below:

$$F\pm = (F_s/12)\{(\omega\pm\omega_d)/2\Pi\}.$$

However, this can be remedied by a dual decimation as described below. The first component corresponding to the − in the above equation is the signal of interest. The second signal corresponding to the + sign in the equation will be filtered out in the next decimation process in step 905 of process 900 (SEE FIG. 9).

Figure 9:
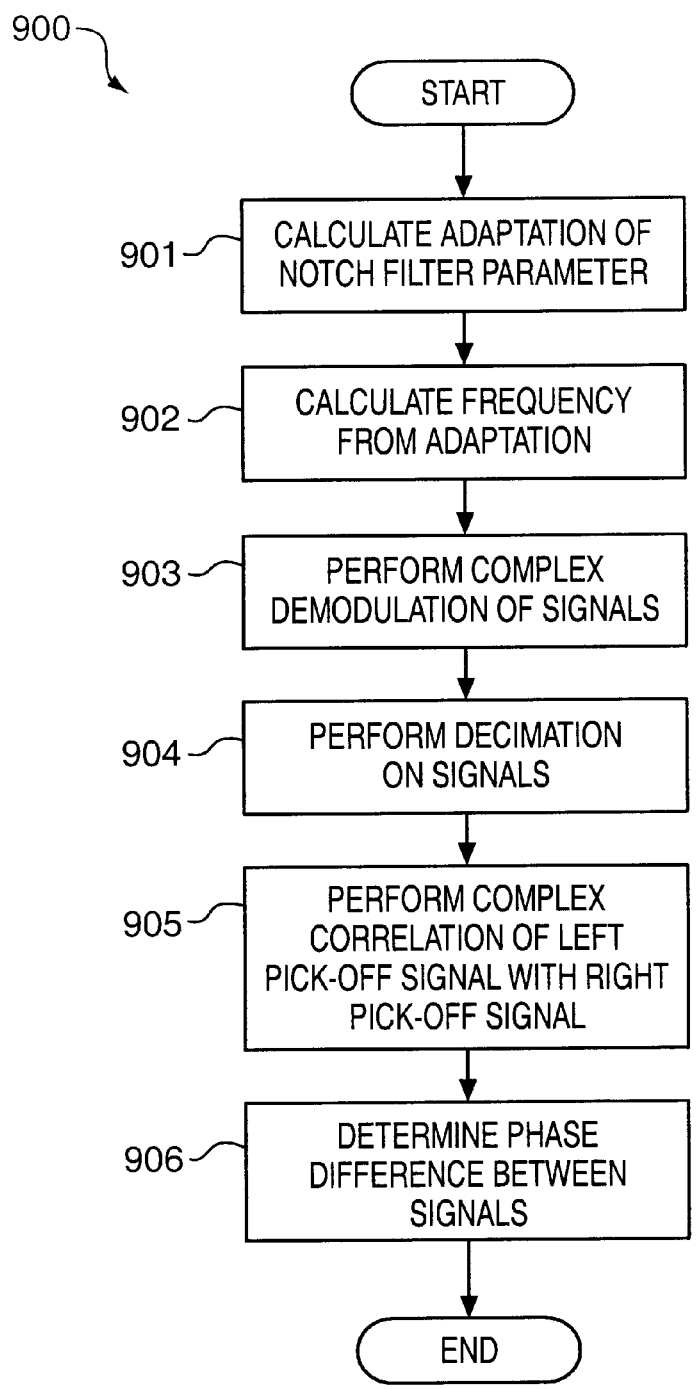
FIG. 9 illustrating a method for determining data about flow tube vibration from the received signals.

Process for Generating Data from the Received Signals—FIG. 9

FIG. 9 illustrates a process 900 for generating data about the signals received from the sensors. Process 900 begins in step 901 by calculating a adaptation of a notch filter parameter which is calculated in the following manner. It is known that a notch filter parameter is a single adaptive parameter represented by:

$$H(z) = \frac{1 + a_1 z^\wedge - 1 + z^\wedge - 2}{1 + \alpha a_1 z^\wedge - 1 + \alpha^\wedge 2 z^\wedge - 2}$$

where α<1 is a convergence parameter adjusting the bandwidth of the filter and $a_1$ is the parameter sought after through adaption. Assume $|a_1|<2$ and then note that:

$$a_1 = -2\cos(\omega)$$

The zero points of H (z) are given by the equation:

$$z\pm = \exp(\pm j\omega)$$

where
- z = zero points;
- j = a constant; and
- ω = signal.

Therefore, poles of the signals are expressed in the following equation:

$$p\pm = \alpha\exp(\pm j\omega)$$

In step 902, $a_1$ is calculated for each signal. $a_1$ is calculated using one of many conventional algorithms such as RLS, RML, or SGN. This minimizes the signal energy.

In step 902, the signal frequency of each signal is determined. In order to determine the frequency of the signal, a normalized frequency with respect to the decimated signal is determined using the following equation:

$$F_o = (1/2\Pi) \arccos(-a_1/2);$$

where
- $F_n$ = normalized frequency with respect to decimated signal; and
- $a_1$ is current adapted value of the notch filter parameter.

The frequency of the signals can then be determined in step 902 by multiplying the normalized frequency by the decimation frequency ($F_t = F_o \times F_s$). In step 903, quadrature demodulation is performed on the signals. Quadrature demodulation is performed by choosing the demodulation signal as shown below the signal's dominant frequency is shifted to zero. In process 903, the dot product of a demodulation signal and the received signals is calculated. The modulation signal is represented in the following manner:

$$\omega_o = 2\Pi F_o;$$

where
- $\omega_o$ = a pulsation of the modulation signal; and
- $F_o$ = the frequency of the normalized signal computed above in step 902.

As noted above the received signals can be shown as:
- $x_\beta(k) = A\cos(\omega_o k + \phi_\beta)$; where β = each signal from a pick-off sensor 105–105'.

From the above equations, the output of the quadrature demodulation is:

$$z_\beta(k) = W_k X_\beta(k) = A/2\{\exp(j\phi_\beta) + \exp(-j(2\omega_o k + \phi_\beta))\}.$$

In order to further increase the signal resolution, a decimation is performed in step 904. In a preferred embodiment, this decimation is a ×40 decimation that is performed on both the I and Q components of the received signals. This decimation reduces the result of the complex quadrature demodulation to:

$$z_\beta(k) = (\alpha/2)\exp(j\phi_\beta).$$

After the decimation is performed, a phase difference of the signals is performed in step 905. In an exemplary embodiment, the phase difference is calculated in the following manner. First one, from either the left or right pick-off sensor, of the received signals is conjugated in accordance with the following equation:

$$z'_{rpo}(k) = (A_{rpo}/2)\exp(-j\Phi_{rpo})$$

Then, the signal is multiplied with the second signal to perform a complex correlation between the pick-off signals as shown in the following equation:

$$q(k) = z_{1st}(k)\bar{z}_{2nd}(k) = (A^\wedge 2/4)\exp(j(\phi_{1st} - \phi_{2nd}))$$

Therefore, the phase difference is given by the following equation:

$$\phi(k) = \arg(q(k)) = \phi_{1st} - \phi_{2nd}.$$

The phase difference can then be used to calculate mass flow rate and other properties of the material flowing through the material.

The above is a description of a digital transmitter 20 for a Coriolis flowmeter 5 and the processes for determining data about signals received by the transmitter 20. It is expected that others will design alternative digital signal processors and processes that infringe on this invention as set forth in the claims below either literally or through the Doctrine of Equivalents.

What is claimed is:

1. A method for processing signals received from a first pick-off sensor and a second pick-off sensor measuring vibrations of a conduit using a digital signal processor to output information about a material flowing through said conduit, said method comprising the steps of:

receiving samples of signals from said first pick-off sensor and said second pick-off sensor at a first sample rate;

decimating said samples from said first sample rate to a desired sample rate;

determining a frequency of vibration for said conduit at said first pick-off and at said second pick-off from said samples of said signals at said desired sample rate;

calculating a normalized frequency of said signals; and demodulating said signals from said first pick-off sensor and said second pick-off sensor to translate said signals to a center frequency, wherein said step of demodulating comprises the steps of:

calculating a normalized pulsation of said normalized frequency of said signals; and calculating dot products of said normalized pulsation and said signals from said first pick-off sensor and said second pick-off sensor to translate said signals to said center frequency.

2. The method of claim 1 wherein said step of calculating said normalized frequency comprises the steps of:

demultiplexing said signals into I components and Q components;

integrating said I components;

integrating said Q components multiplexing said I components and said Q components to produce digitally integrated signals; and calculating a ratio between an amplitude of said signals and an amplitude of said digitally integrated signals to produce said normalized frequency of said signals.

3. The method of claim 2 wherein said step of calculating said normalized frequency further comprises the step of:

applying said integrated Q components to a compensator responsive to said step of integrating prior to said step of multiplexing.

4. The method of claim 2 wherein said step of calculating said normalized frequency further comprises the step of:

applying said integrated I components to a compensator responsive to said step of integrating prior to said step of multiplexing.

5. The method of claim 1 further comprising the step of:

determining properties of said material flowing through said conduit responsive to determining said frequency of said signals from said first pick-off sensor and said signals from said second pick-off sensor.

6. The method of claim 5 wherein one of said properties is mass flow rate of said material flowing through said conduit.

7. The method of claim 5 wherein one of said properties is density of said material flowing through said conduit.

8. The method of claim 1 wherein said step of determining said frequency of vibration of said conduit comprises the steps of:

modulating said normalized frequency of said signals; and performing a complex demodulation of said signals using said modulated normalized frequency to determine said frequency.

9. The method of claim 8 wherein said step of determining said frequency of vibration of said conduit further comprises the steps of:

decimating said demodulated signals;

performing a complex correlation of said signals to determine a phase difference between said signals.

10. The method of claim 1 wherein said step of decimating said samples from said first pick-off sensor and said signals from said second pick-off sensor comprises the step of:

performing a preliminary decimation from said first sample rate to an intermediate sample rate responsive to receiving said signals from said first and said second pickoff sensors.

11. The method of claim 10 wherein said step of decimating further comprises the steps of:

demodulating said signals into an I component and a Q component; and performing a secondary decimation of said samples of said signals from said intermediate sample rate to a final sample rate responsive to said demodulation of said signals.

12. The method of claim 1 further comprising:

determining a phase difference between said signals from said first pick-off sensor and said signals from said second pick-off sensor.

13. A product for directing a processor controlling an apparatus that has a vibrating conduit for measuring properties of a material flowing through said conduit to process signals received from a first pick-off sensor and a second pick-off sensor connected to said conduit, said product comprising:

instructions operational to perform receiving samples of signals from said first and said second pick-off sensors at a first sample rate, decimating said samples from said first sample rate to a desired sample rate, determining a frequency of vibration for said conduit at said first pickoff sensor and at said second pick-off sensor from said samples of said signals at said desired sample rate, calculating a normalized frequency of said signals, and demodulating said signals from said first pick-off sensor and said second pick-off sensor to translate said signals to a center frequency, wherein said step of demodulating comprises the steps of:

calculating a normalized pulsation of said normalized frequency of said signals; and calculating dot products of said normalized pulsation and said signals from said first pick-off sensor and said second pick-off sensor to translate said signals to said center frequency; and a processor readable storage media for storing said instructions.

14. The product of claim 13 wherein said instructions for calculating said normalized frequency comprises instructions to perform:
   demultiplexing said signals into an I component and a Q component;
   integrating said I component;
   integrating said Q component;
   multiplexing said I component and said Q component to produce digitally integrated signals; and
   calculating a ratio between an amplitude of said signals and said digitally integrated signals to produce said normalized frequency of said signals.

15. The product of claim 14 wherein said instruction of calculating said normalized frequency comprises instructions to perform:
   applying said integrated Q component to a compensator responsive to said step of integrating prior to said step of multiplexing.

16. The product of claim 14 wherein said instructions of calculating said normalized frequency further comprises instructions to perform:
   applying said integrated I component to a compensator responsive to said step of integrating prior to said step of multiplexing.

17. The product of claim 13 wherein said instructions further comprise instructions to perform:
   determining properties of said material flowing through said conduit responsive to determining said frequency of said signals from said first pick-off sensor and said signals from said second pick-off sensor.

18. The product of claim 17 wherein one of said properties is mass flow rate of said material flowing through said conduit.

19. The product of claim 17 wherein one of said properties is density of said material flowing through said conduit.

20. The product of claim 13 wherein said instructions for determining said frequency of vibration of said conduit comprises the instructions to perform:
   modulating said normalized frequency of said signals; and
   performing a complex demodulation of said signals using said modulated normalized frequency to determine said frequency.

21. The product of claim 20, wherein said instructions for determining said frequency of vibration of said conduit further comprise the instructions to perform:
   decimating said demodulated signals;
   performing a complex correlation of said signals to determine a phase difference between said signals.

22. The product of claim 17 wherein one of said properties is mass flow rate of said material flowing through said conduit.

23. The product of claim 22 wherein said instructions for decimating further comprises instructions for:
   demodulating said signals from an I component and a Q component; and
   performing a secondary decimation of said samples of said signals from said intermediate sample rate to a final sampled rate responsive to said demodulation of said signals.

24. The product of claim 13 wherein said instructions further comprise instructions to perform:
   determining a phase difference between said signals from said first pick-off sensor and said signals from said second pick-off sensor.

25. The product of claim 17 wherein said apparatus is a Coriolis flowmeter.

26. A transmitter for a Coriolis flowmeter comprising:
   a processing unit;
   a memory storage media readable by said processing unit; and
   processor readable instructions stored in said storage media for directing said processing unit to perform
      receiving samples of signals from first and second pick-off sensors at a first sample rate,
      decimating said samples from said first sample rate to a desired sample rate,
      determining a frequency of vibration for said conduit at said first pick-off sensor and at said second pick-off sensor from said samples of said signals at said desired sample rate,
      calculating a normalized frequency of said signals, and
      demodulating said signals from said first pick-off sensor and said second pick-off sensor to translate said signals to a center frequency, wherein said step of demodulating comprises the steps of:
         calculating a normalized pulsation of said normalized frequency of said signals; and
         calculating dot products of said normalized pulsation and said signals from said first pick-off sensor and said second pick-off sensor to translate said signals to said center frequency.

* * * * *

UNITED STATES PATENT AND TRADEMARK OFFICE
CERTIFICATE OF CORRECTION

PATENT NO.      : 6,505,131 B1
DATED           : January 7, 2003
INVENTOR(S)  : Denis Henrot It is certified that error appears in the above-identified patent and that said Letters Patent is hereby corrected as shown below:

Column 9,
Line 25, replace "β = *receivedsignalftomeither*" with -- β = *receivedsignalfromeither* --
Line 57, replace "where α<1 is a convergence parameter adjusting the band-" with
-- where a <1 is a convergence parameter adjusting the band- --

Column 10,
Line 68, replace "$q(k) = z_{1st}(k)\bar{z}_{2nd}(k) = (A^2/4)\exp(j(\phi_{1st} - \phi_{2nd}))$"
with -- $q(k) = z_{1st}(k)\bar{z}_{2nd}(k) = \left(\frac{A^2}{4}\right)\exp(j(\phi_{1st} - \phi_{2nd}))$ Column 11, line 17 through Column 14, line 46,
Replace with --

1. A method for processing signals received from a first pick-off sensor and a second pick-off sensor measuring vibrations of a conduit using a digital signal processor to output information about a material flowing through said conduit, said method comprising the steps of:
    receiving samples of signals from said first pick-off sensor and said second pick-off sensor at a first sample rate;
    decimating said samples from said first sample rate to a desired sample rate;
    determining a frequency of vibration for said conduit at said first pick-off sensor and at said second pick-off sensor from said samples of said signals at said desired sample rate;
    calculating a normalized frequency of said signals; and
    demodulating said signals from said first pick-off sensor and said second pick-off sensor to translate said signals to a center frequency, wherein said step of demodulating comprises the steps of:
    calculating a normalized pulsation of said normalized frequency of said signals; and
    calculating dot products of said normalized pulsation and said signals from said first pick-off sensor and said second pick-off sensor to translate said signals to said center frequency.

2. The method of claim 1 wherein said step of calculating said normalized frequency comprises the steps of:
    demultiplexing said signals into I components and Q components;
    integrating said I components;
    integrating said Q components;
    mutliplexing said I components and said Q components to produce digitally integrated signals; and
    calculating a ratio between an amplitude of said signals and an amplitude of said digitally integrated signals to produce said normalized frequency of said signals.

UNITED STATES PATENT AND TRADEMARK OFFICE
CERTIFICATE OF CORRECTION

PATENT NO. : 6,505,131 B1
DATED : January 7, 2003
INVENTOR(S) : Denis Henrot

It is certified that error appears in the above-identified patent and that said Letters Patent is hereby corrected as shown below:

3. The method of claim 2 wherein said step of calculating said normalized frequency further comprises the step of:
  applying said integrated Q components to a compensator responsive to said step of integrating prior to said step of multiplexing.

4. The method of claim 2 wherein said step of calculating said normalized frequency further comprises the step of:
  applying said integrated I components to a compensator responsive to said step of integrating prior to said step of multiplexing.

5. The method of claim 1 wherein said step of determining said frequency of vibration of said conduit comprises the steps of:
  modulating said normalized frequency of said signals; and
  performing a complex demodulation of said signals using said modulated normalized frequency to determine said frequency.

6. The method of claim 5 wherein said step of determining said frequency of vibration of said conduit further comprises the steps of:
  decimating said demodulated signals;
  performing a complex correlation of said signals to determine a phase difference between said signals.

7. The method of claim 1 further comprising:
  determining a phase difference between said signals from said first pick-off sensor and said signals from said second pick-off sensor.

8. The method of claim 1 further comprising the steps of:
  determining properties of said material flowing through said conduit responsive to determining said frequency of said signals from said first pick-off sensor and said signals from said second pick-off sensor.

9. The method of claim 8 wherein one of said properties is mass flow rate of said material flowing through said conduit.

10. The method of claim 8 wherein one of said properties is density of said material flowing through said conduit.

11. The method of claim 1 wherein said step of decimating said samples from said first pick-off sensor and said signals from said second pick-off sensor comprises the step of:
  performing a preliminary decimation from said first sample rate to an intermediate sample rate responsive to receiving said signals from said first and said second pick-off sensors.

12. The method of claim 11 wherein said step of decimating further comprises the steps of:
  demodulating said signals into an I component and Q component; and
  performing a secondary decimation of said samples of said signals from said intermediate sample rate to a final sample rate responsive to said demodulation of said signals.

13. A product for directing a processor controlling an apparatus that has a vibrating conduit for measuring properties of a material flowing through said conduit to process signals received from a first pick-off sensor and a second pick-off sensor connected to said conduit, said product comprising:
  instructions operational to perform receiving samples of signals from said first and said second pick-off sensors at a first sample rate,
  decimating said samples from said first sample rate to a desired sample rate, and
  determining a frequency of vibration for said conduit at said first pick-off sensor and at said second pick-off sensor from said samples of said signals at said desired sample rate,
  calculating a normalized frequency of said signals, and
  demodulating said signals from said first pick-off sensor and said second pick-off sensor to translate said signals to a center frequency, wherein said step of demodulating comprises the steps of:
  calculating a normalized pulsation of said normalized frequency of said signals; and
  calculating dot products of said normalized pulsation and said signals from said first pick-off sensor and said second pick-off sensor to translate said signals to said center frequency; and
  a processor readable storage media for storing said instructions.

UNITED STATES PATENT AND TRADEMARK OFFICE
CERTIFICATE OF CORRECTION

PATENT NO. : 6,505,131 B1
DATED : January 7, 2003
INVENTOR(S) : Denis Henrot

It is certified that error appears in the above-identified patent and that said Letters Patent is hereby corrected as shown below:

14. The product of claim 13 wherein said instructions for calculating said normalized frequency comprises instructions to perform:
   demultiplexing said signals into an I component and a Q component;
   integrating said I component;
   integrating said Q component;
   mutliplexing said I component and said Q component to produce digitally integrated signals; and
   calculating a ratio between an amplitude of said signals and said digitally integrated signals to produce said normalized frequency of said signals.

15. The product of claim 14 wherein said instruction of calculating said normalized frequency comprises instructions to perform:
   applying said integrated Q component to a compensator responsive to said step of integrating prior to said step of multiplexing.

16. The product of claim 14 wherein said instructions of calculating said normalized frequency further comprises instructions to perform:
   applying said integrated I component to a compensator responsive to said step of integrating prior to said step of multiplexing.

17. The product of claim 13 wherein said instructions for determining said frequency of vibration of said conduit comprises the instructions to perform:
   modulating said normalized frequency of said signals; and
   performing a complex demodulation of said signals using said modulated normalized frequency to determine said frequency.

18. The product of claim 17 wherein said instructions for determining said frequency of vibration of said conduit further comprise the instructions to perform:
   decimating said demodulated signals;
   performing a complex correlation of said signals to determine a phase difference between said signals.

19. The product of claim 13 wherein said instructions further comprise instructions to perform:
   determining a phase difference between said signals from said first pick-off sensor and said signals from said second pick-off sensor.

20. The product of claim 13 wherein said instructions further comprise instructions to perform:
   determining properties of said material flowing through said conduit responsive to determining said frequency of said signals from said first pick-off sensor and said signals from said second pick-off sensor.

21. The product of claim 20 wherein one of said properties is mass flow rate of said material flowing through said conduit.

22. The product of claim 20 wherein one of said properties is density of said material flowing through said conduit.

23. The product of claim 13 wherein said instructions for decimating said samples of said signals from said first pick-off sensor and said signals from said second pick-off sensor comprise instructions for:
   performing a preliminary decimation from said first sample rate to an intermediate sample rate responsive to receiving said signals from said first and said second pick-off sensors.

24. The product of claim 23 wherein said instructions for decimating further comprises instructions for:
   demodulating said signals from an I component and a Q component; and
   performing a secondary decimation of said samples of said signals from said intermediate sample rate to a final sample rate responsive to said demodulation of said signals.

25. The product of claim 13 wherein said apparatus is a Coriolis flowmeter.

UNITED STATES PATENT AND TRADEMARK OFFICE
CERTIFICATE OF CORRECTION

PATENT NO. : 6,505,131 B1
DATED : January 7, 2003
INVENTOR(S) : Denis Henrot

It is certified that error appears in the above-identified patent and that said Letters Patent is hereby corrected as shown below:

26. A transmitter for a Coriolis flowmeter comprising:
    a processing unit;
    a memory storage media readable by said processing unit; and
    processor readable instructions stored in said storage media for directing said processing unit to perform receiving samples of signals from first and second pick-off sensors at a first sample rate,
    decimating said samples from said first sample rate to a desired sample rate,
    determining a frequency of vibration for said conduit at said first pick-off sensor and at said second pick-off sensor from said samples of said signals at said desired sample rate,
    calculating a normalized frequency of said signals, and
    demodulating said signals from said first pick-off sensor and said second pick-off sensor to translate said signals to a center frequency, wherein said step of demodulating comprises the steps of:
    calculating a normalized pulsation of said normalized frequency of said signals; and
    calculating dot products of said normalized pulsation and said signals from said first pick-off sensor and said second pick-off sensor to translate said signals to said center frequency. --

Signed and Sealed this

Sixth Day of July, 2004

JON W. DUDAS
*Acting Director of the United States Patent and Trademark Office*